United States Patent
Salim et al.

(10) Patent No.: US 11,296,847 B2
(45) Date of Patent: Apr. 5, 2022

(54) RS FOR PUSCH REPETITIONS

(71) Applicant: JRD Communication (SHENZHEN) LTD., Guangdong (CN)

(72) Inventors: Umer Salim, Guangdong (CN); Trung Kien Le, Guangdong (CN); Sebastian Wagner, Guangdong (CN)

(73) Assignee: JRD Communication (SHENZHEN) LTD., Guangdong (CN)

( * ) Notice: Subject to any disclaimer, the term of this patent is extended or adjusted under 35 U.S.C. 154(b) by 0 days.

(21) Appl. No.: 16/760,433

(22) PCT Filed: Feb. 12, 2020

(86) PCT No.: PCT/CN2020/074790
§ 371 (c)(1),
(2) Date: Apr. 29, 2020

(87) PCT Pub. No.: WO2020/164495
PCT Pub. Date: Aug. 20, 2020

(65) Prior Publication Data
US 2021/0367732 A1 Nov. 25, 2021

Related U.S. Application Data

(60) Provisional application No. 62/805,206, filed on Feb. 13, 2019.

(51) Int. Cl.
*H04L 5/00* (2006.01)
*H04L 27/26* (2006.01)
*H04W 72/04* (2009.01)

(52) U.S. Cl.
CPC ........ *H04L 5/0051* (2013.01); *H04L 27/2613* (2013.01); *H04W 72/0406* (2013.01); *H04W 72/0446* (2013.01)

(58) Field of Classification Search
CPC .............. G01N 33/5061; G01N 33/567; H04L 5/0048; H04L 5/0051; H04W 92/18; H04W 72/1278; H04W 72/0446; H04W 72/04
See application file for complete search history.

(56) References Cited

U.S. PATENT DOCUMENTS

| | | | |
|---|---|---|---|
| 2018/0048446 A1 | 2/2018 | Jiang et al. | |
| 2018/0212733 A1* | 7/2018 | Khoryaev | H04L 5/0051 |
| 2018/0376438 A1* | 12/2018 | Islam | H04W 72/0406 |
| 2019/0037554 A1 | 1/2019 | Gao et al. | |
| 2020/0195399 A1* | 6/2020 | Sano | H04L 5/1469 |

FOREIGN PATENT DOCUMENTS

| | | |
|---|---|---|
| KR | 2017-0053436 A | 5/2017 |
| KR | 2018-0107995 A | 10/2018 |
| WO | 2018/016904 A1 | 1/2018 |
| WO | 2018/025949 A1 | 2/2018 |
| WO | 2019/014498 A1 | 1/2019 |

OTHER PUBLICATIONS

"Discussions on NR V2X Sidelink Physical Layer Structures and Procedures", Nokia, 3GPP TSG RAN WG1 Meeting #94bis, R1-1811427, 2018.
"Physical layer structure for NR sidelink", Vivo, 3GPP TSG RAN WG1 Ad-Hoc Meeting 1901, R1-1900117, 2019.

* cited by examiner

*Primary Examiner* — Iqbal Zaidi
(74) *Attorney, Agent, or Firm* — BakerHostetler

(57) ABSTRACT

Sub-sampled DMRS are utilised in repeated mini-slots for PUSCH transmission. Each sub-sampled DMRS may be multiplex with data in the respective symbol.

11 Claims, 8 Drawing Sheets

Frequency

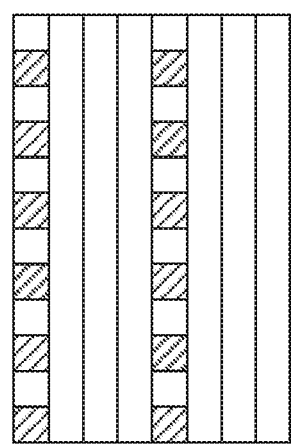 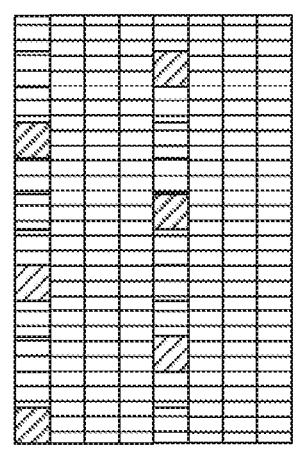
Fig.5 A        Fig.5 B

Type 1 DMRS with 1/3 Sub-Sampling

Type 1 1/3 Sub-Sampled
DMRS used for 4 Repetition

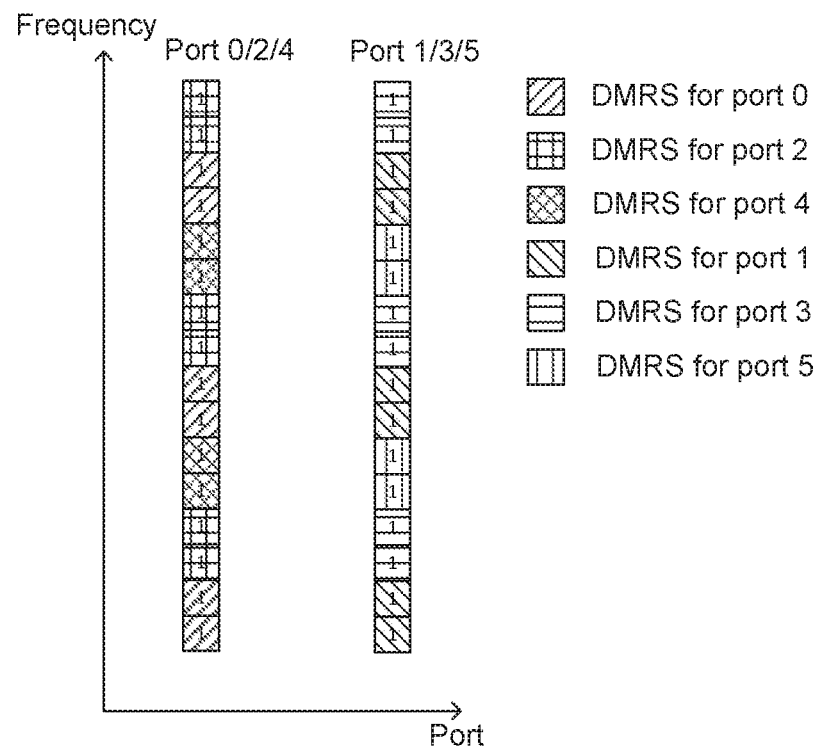
Fig. 7(A) NR DMRS Design for Type 2
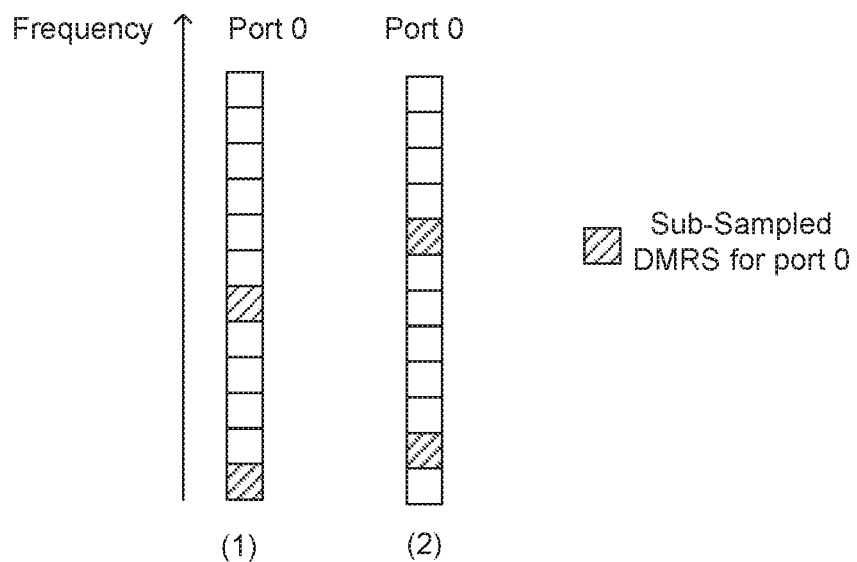
Fig.7(B) Sub-Sampling for Port 0

RS FOR PUSCH REPETITIONS

CROSS-REFERENCE TO RELATED APPLICATIONS

This application is a National Stage of International patent application PCT/CN2020/074790, filed on Feb. 12, 2020, which claims priority to U.S. Provisional Patent Application No. 62/805,206, filed Feb. 13, 2019, the disclosures of which are incorporated by reference in their entirety.

TECHNICAL FIELD

The following disclosure relates to reference signals (RS) for uplink signals in cellular communications networks.

BACKGROUND

Wireless communication systems, such as the third-generation (3G) of mobile telephone standards and technology are well known. Such 3G standards and technology have been developed by the Third Generation Partnership Project (3GPP). The 3rd generation of wireless communications has generally been developed to support macro-cell mobile phone communications. Communication systems and networks have developed towards a broadband and mobile system.

In cellular wireless communication systems User Equipment (UE) is connected by a wireless link to a Radio Access Network (RAN). The RAN comprises a set of base stations which provide wireless links to the UEs located in cells covered by the base station, and an interface to a Core Network (CN) which provides overall network control. As will be appreciated the RAN and CN each conduct respective functions in relation to the overall network. For convenience the term cellular network will be used to refer to the combined RAN & CN, and it will be understood that the term is used to refer to the respective system for performing the disclosed function.

The 3rd Generation Partnership Project has developed the so-called Long Term Evolution (LTE) system, namely, an Evolved Universal Mobile Telecommunication System Territorial Radio Access Network, (E-UTRAN), for a mobile access network where one or more macro-cells are supported by a base station known as an eNodeB or eNB (evolved NodeB). More recently, LTE is evolving further towards the so-called 5G or NR (new radio) systems where one or more cells are supported by a base station known as a gNB. NR is proposed to utilise an Orthogonal Frequency Division Multiplexed (OFDM) physical transmission format.

The NR protocols are intended to offer options for operating in unlicensed radio bands, to be known as NR-U. When operating in an unlicensed radio band the gNB and UE must compete with other devices for physical medium/ resource access. For example, Wi-Fi, NR-U, and LAA may utilise the same physical resources.

A trend in wireless communications is towards the provision of lower latency and higher reliability services. For example, NR is intended to support Ultra-reliable and low-latency communications (URLLC) and massive Machine-Type Communications (mMTC) are intended to provide low latency and high reliability for small packet sizes (typically 32 bytes). A user-plane latency of 1 ms has been proposed with a reliability of 99.99999%, and at the physical layer a packet loss rate of $10^{-5}$ or $10^{-6}$ has been proposed.

The disclosure below relates to various improvements to cellular wireless communications systems.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The non-transitory computer readable medium may comprise at least one from a group consisting of: a hard disk, a CD-ROM, an optical storage device, a magnetic storage device, a Read Only Memory, a Programmable Read Only Memory, an Erasable Programmable Read Only Memory, EPROM, an Electrically Erasable Programmable Read Only Memory and a Flash memory.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale. Like reference numerals have been included in the respective drawings to ease understanding.

FIGS. 5A-5B show sub-sampled DMRS and multiplexed data transmission;

FIGS. 7A-7B show a Type 2 DMRS signal; and

DETAILED DESCRIPTION OF THE PREFERRED EMBODIMENTS

Those skilled in the art will recognise and appreciate that the specifics of the examples described are merely illustrative of some embodiments and that the teachings set forth herein are applicable in a variety of alternative settings.

Figure 1:
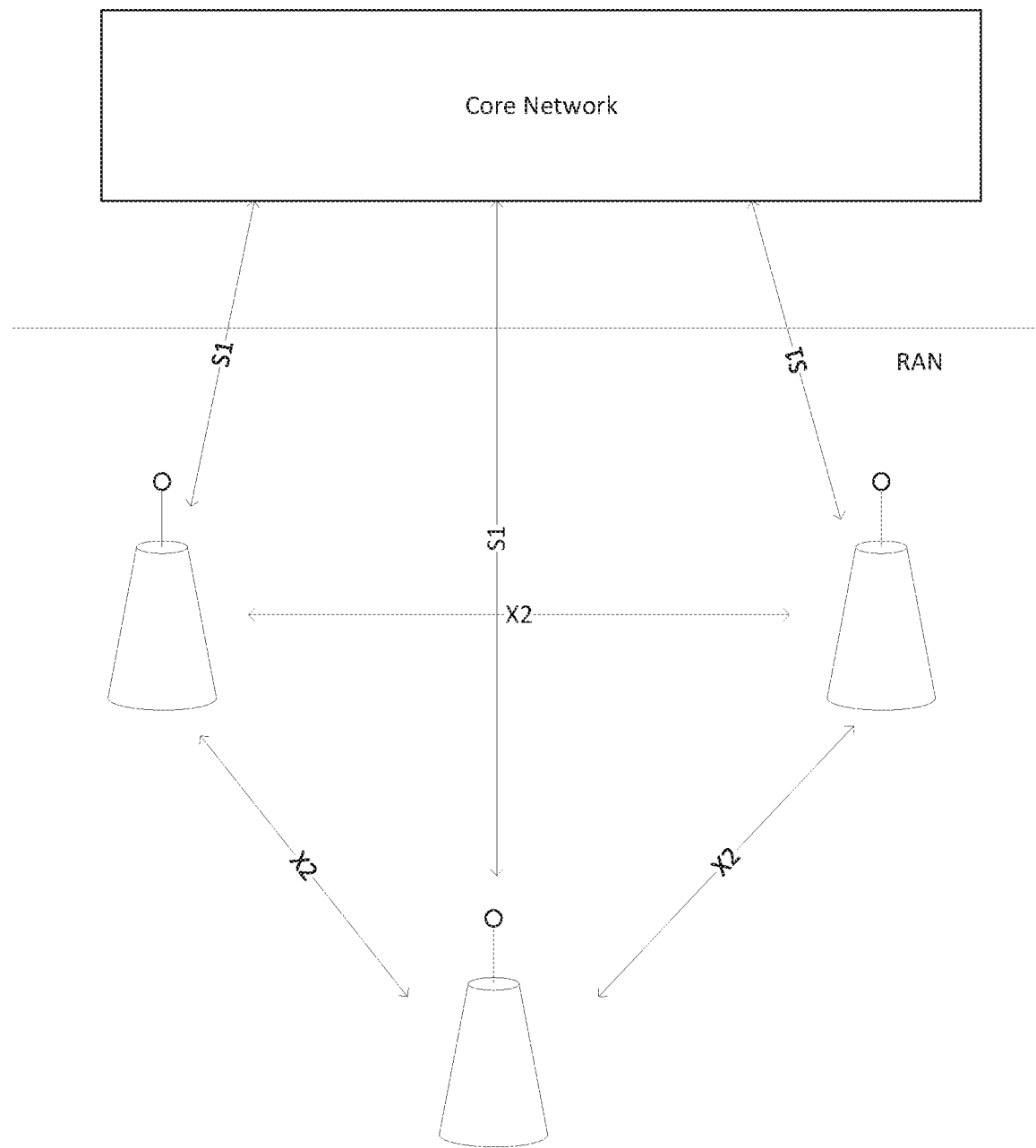
FIG. 1 shows a schematic diagram of selected components of a cellular communications network.

FIG. 1 shows a schematic diagram of three base stations (for example, eNB or gNBs depending on the particular cellular standard and terminology) forming a cellular network. Typically, each of the base stations will be deployed by one cellular network operator to provide geographic coverage for UEs in the area. The base stations form a Radio Area Network (RAN). Each base station provides wireless coverage for UEs in its area or cell. The base stations are interconnected via the X2 interface and are connected to the core network via the S1 interface. As will be appreciated only basic details are shown for the purposes of exemplifying the key features of a cellular network. The interface and component names mentioned in relation to FIG. 1 are used for example only and different systems, operating to the same principles, may use different nomenclature.

The base stations each comprise hardware and software to implement the RAN's functionality, including communications with the core network and other base stations, carriage of control and data signals between the core network and UEs, and maintaining wireless communications with UEs associated with each base station. The core network comprises hardware and software to implement the network functionality, such as overall network management and control, and routing of calls and data.

Figure 2:
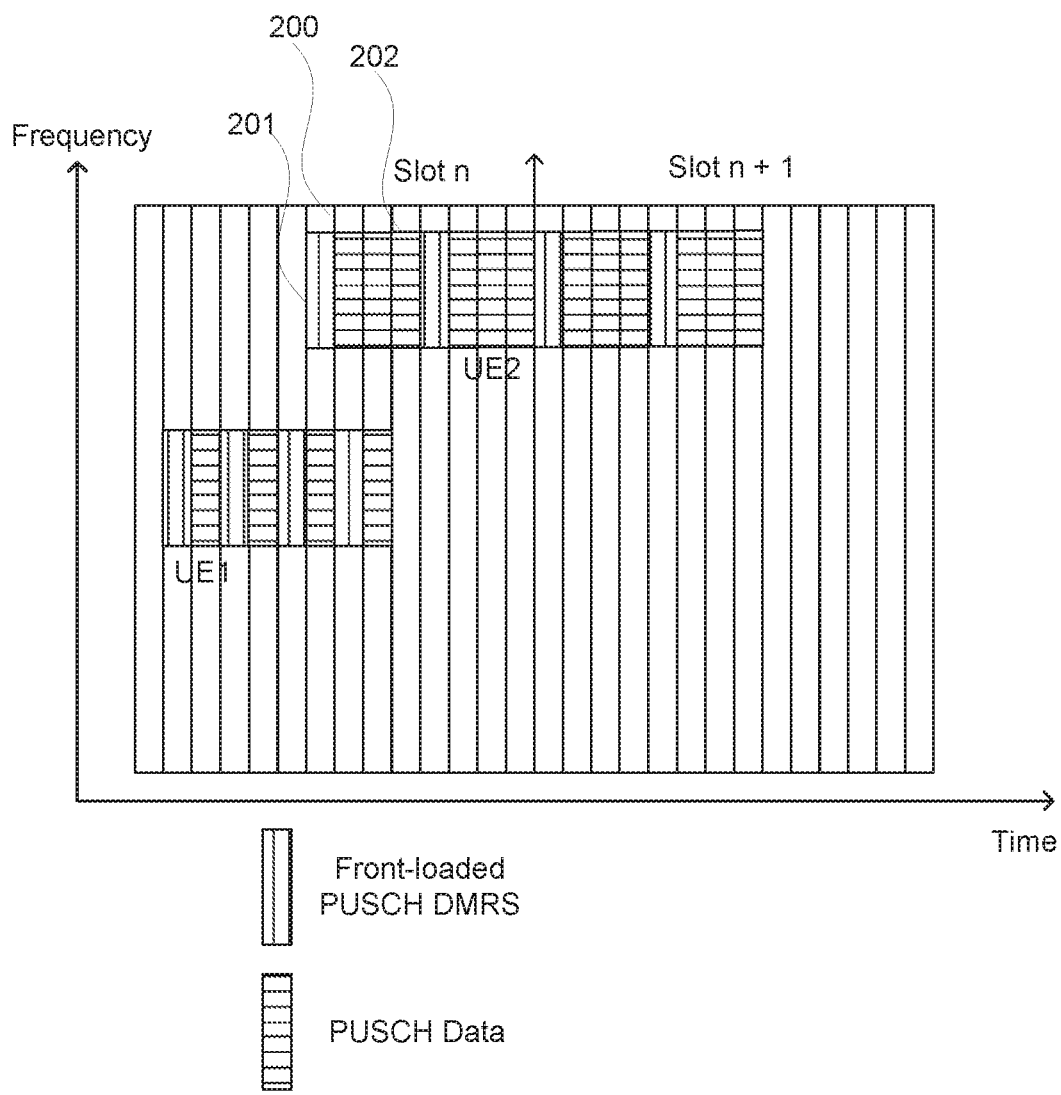
FIG. 2 shows an example of repeated mini-slots.

Cellular standards utilising OFDM transmission protocols divide time into a contiguous series of slots, each slot comprising a plurality of OFDM symbols. Frequency resources may also be divided such that a block of resources is defined by both the time and frequency occupied. To provide flexibility in the allocation of resources, mini-slots may be defined comprising one or more symbols, and some or all frequency resources in those symbols. FIG. 2 shows an example of a mini-slot 200. The mini-slot 200 comprises a DMRS symbol 201 in the first symbol of the mini-slot, followed by 3 data symbols 202.

In FIG. 2, the mini-slot 200 is repeated 3 further times in order to improve channel quality. Such repetitions can be an important feature for URLLC services in order to provide the required reliability. These repetitions can be configured to be transmitted with same or different redundancy versions of data. As is apparent from FIG. 2, each mini-slot comprises a DMRS symbol and the repeated data. The repeated DMRS symbols may assist in decoding the signals at the receiver, but represent a significant signalling overheard which consumes resources not then available for data transmission. In this example the overhead represents 25% of the resources. Furthermore, the reduction in resources available for data transmission may compel the use of a higher code-rate for the data, thus making reception more difficult. Also shown in FIG. 2 is a mini-slot comprising only two symbols, in which the DMRS overhead is 50%.

Figure 3:
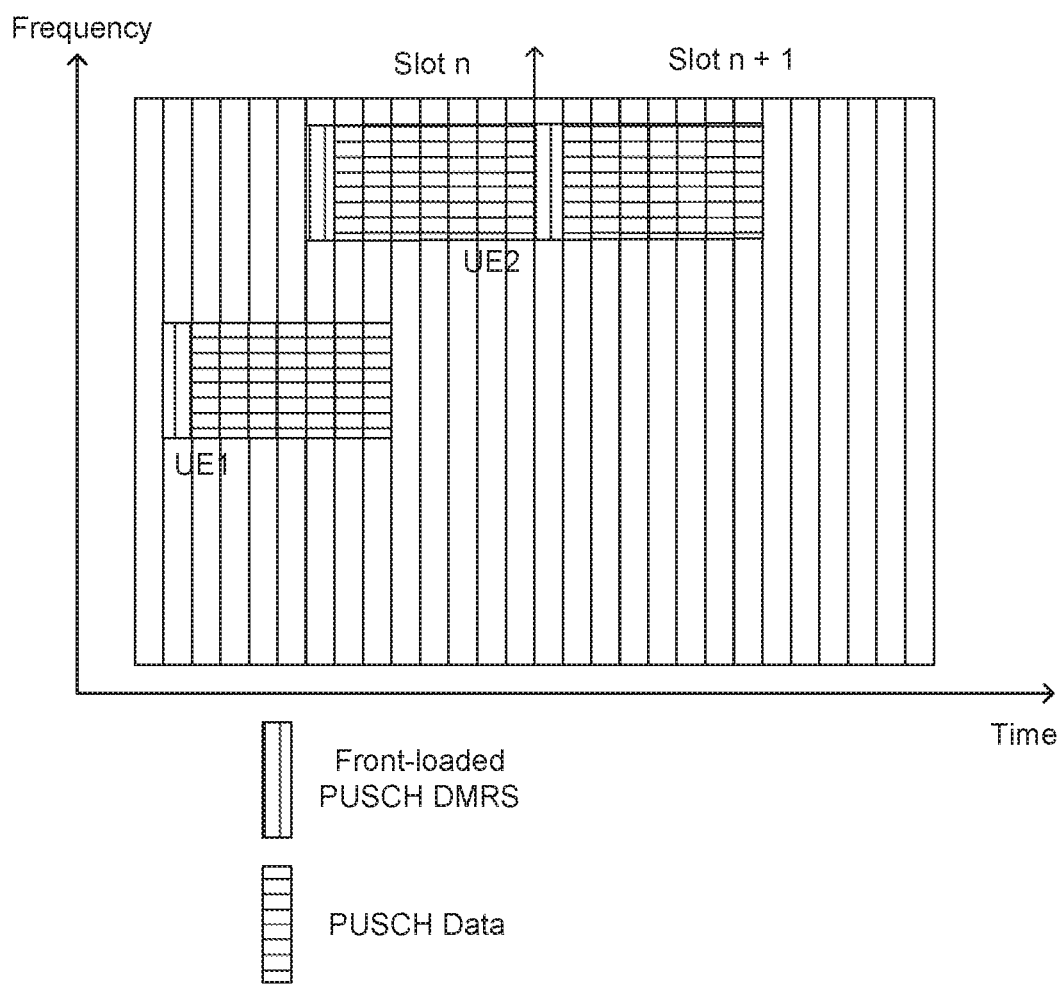
FIG. 3 shows repeated mini-slots with DMRS only in the first mini-slot.

FIG. 3 shows an alternative option in which DMRS is only transmitted in the first mini-slot of each slot. Therefore, for UE1 only one DMRS is transmitted at the start of the repetitions which reduces the DMRS overhead to 12.5%. Although this reduces the DMRS overhead the subsequent repetitions of the mini-slot must be decoded using the first DMRS symbol, which may reduce reliability, particularly for UEs with quickly-changing channels.

For UE2 in FIG. 3 the DMRS is repeated as the repetitions span a slot boundary, but there are still significant lengths of time without a DMRS. Furthermore, in both of these examples the resources available for data vary between each mini-slot. For UE1 in the original transmission there is one symbol available, but in each subsequent repetition there are two symbols. The UE must therefore decide whether to encode for the first mini-slot and rate-match the data for the remaining slots or encode for the later repetitions and puncture the signal in the first repetitions. Alternatively, the UE could encode the data in two different ways. However, all of these options increase complexity and add processing requirements.

Figure 4A:
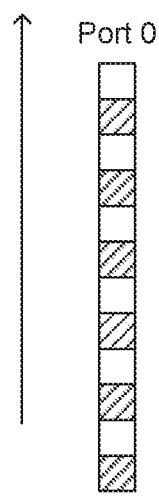
FIGS. 4A-4C show sub-sampled DMRS.
Figure 4B:
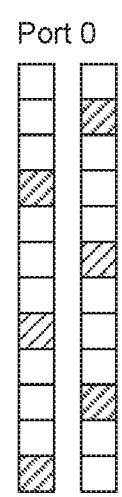
Figure 4C:
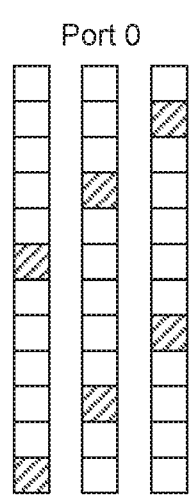

FIGS. 4A-4C show an example of a DMRS structure for use with repetitions of uplink mini-slots which seeks to address some or all of the disadvantages discussed above. FIG. 4A represents a conventional single-symbol DMRS pattern (e.g. NR type 1 DMRS pattern as standardized in 3GPP Release-15) in which 50% of the frequency resources are occupied. This pattern is for single port operation. Using available frequency domain resources and doing code-division multiplexing, Type 1 can multiplex up to 4 ports for single symbol DMRS. In certain configurations the unused frequency resources may be used for a second (or more) port.

FIG. 4B shows two sub-sampled versions of the full DMRS. Each signal is sub-sampled with a factor of ½ thus resulting in each signal occupying 25% of the resources. In this example, the sampling in each case is offset such that a compilation of the two signals recreates the full signal. FIG. 4C shows a further example of a sub-sampled DMRS of FIG. 4A, sampled with a ⅓ factor, thus resulting in three signals each occupying ⅙ of the resources. Again, in this example the sampling for each signal is offset such that the full signal is represented.

The reduced density of the DMRS signals may free resources in which data can be transmitted, multiplexed with the DMRS.

FIGS. 5A-5B show an example utilising sub-sampled DMRS for repetitions of mini-slots carrying PUSCH transmissions. FIG. 5A shows a conventional approach utilising the full DMRS (in this example a Type 1 DMRS) repeated at the start of each mini-slot. Each DMRS occupies 50% of the respective symbol. The remainder of the symbol may be utilised for DMRS by other UEs. Three symbols are fully available for data transmission and hence the signalling overhead is 25%.

In FIG. 5B the DMRS is sub-sampled at ½, and the sub-sampled DMRS transmitted in the first symbol of each mini-slot. As noted above, off-set samples are used for each mini-slot thus ensuring the full signal is transmitted when combined over the two repetitions Furthermore, in FIG. 5B data is multiplexed with the sub-sampled DMRS in the first symbol of each slot. The signalling overhead of FIG. 5B is thus 6.25%. The use of sub-sampled DMRS, and data multiplexing, thus reduces the signalling overhead substantially. Furthermore, the resources available for data in each mini-slot are consistent, thus removing the coding challenges described hereinbefore, and the DMRS signals are spread through the data transmission in time thus improving the detection probability, particularly for rapidly moving UEs. Also, the transmission of a DMRS at the start of every mini-slot provides an even DMRS distribution over time, even if the repetitions span a slot boundary.

A potential advantage of this scheme is that despite the reduced DMRS density, the impact on decoding latency is minimal. For example, to decode the first mini-slot of FIG. 5B, the base station can combine the front-loaded DMRS of the first repetition with the front-loaded DMRS of the second repetition. This gives the same DMRS density as in FIG. 5A with a slight delay of one symbol. On the other hand, the reduced DMRS density results in increased available resource and same size for encoded transport blocks.

FIG. 5B has used all the available resource elements in the DMRS symbol. This leads to single port or single layer transmission. One would note that for URLLC applications with very strong requirements on latency and reliability, multi-layer and multi-user transmissions are likely to be very challenging and may degrade the quality of such transmissions. Thus, it is likely that transmissions will be restricted to single layer (single port) transmissions and use all the unused resource elements in DMRS symbols for data multiplexing.

FIGS. 5A-5B have shown an example with mini-slot length of 4 OFDM symbols. For mini-slot lengths of up to 4 OFDM symbols, NR Release 15 only allows front-loaded DMRS symbol. For mini-slots with length more than 4 OFDM symbols, one or more additional DMRS symbols can be configured for improved channel estimation which would result in enhanced decodability. When the repetitions of mini-slots are scheduled with additional DMRS, the sub-sampled DMRS design can replace each DMRS symbol including the front-loaded and the additional ones to minimize the excessive DMRS overhead. To decode a specific repetition, the receiver can prepare the channel estimates using the DMRS of the repetition combined with the neighbouring repetitions.

Figure 6:
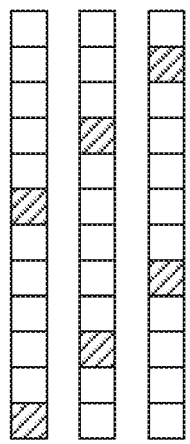
FIGS. 6A-6B show a further example of sub-sampled DMRS.
Figure 6:
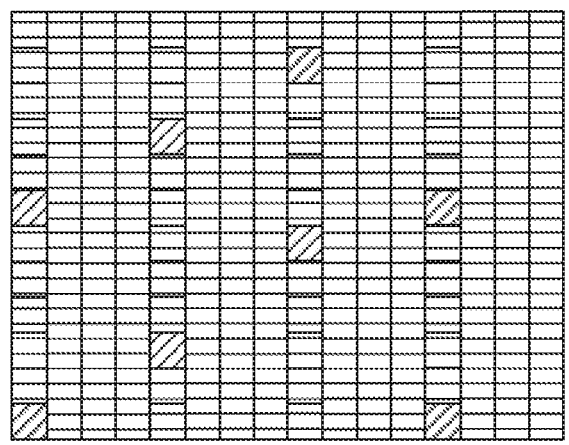

FIG. 6A shows an example DMRS pattern with ⅓ sub-sampling applied to a single symbol DMRS Type 1 signal. FIG. 6B shows a PUSCH transmission with four repetitions of a four-symbol mini-slot. In the first three mini-slots one of the sub-sampled DMRS signals is transmitted in the first symbol of each mini-slot. In the fourth mini-slot, the system configured to use the set of sub-sampled DMRSs in a cyclic manner, returns to the same sub-sampled pattern used in the first mini-slot. The repetitions thus have a consistent distribution of DMRS signals through the length of the transmission. As this example uses a total of 16 symbols for the transmission of four repetitions, the repetitions must cross a slot-boundary to span more than one slot. Due to the cyclic use of the set of sub-sampled DMRS signals no different process is required after the slot boundary and alternating cyclic use of DMRS patterns would be perfectly applicable.

The processes described above can be summarised in that a set of sub-sampled DMRS signals is generated, and one of the sub-sampled DMRS is transmitted in the first symbol of each repetition of a mini-slot. Data may be multiplexed with the DMRS in the first symbol on all the available resource elements. The sub-sampled DMRS may be used in a cyclic manner. Alternatively, the same, or a sub-set of the sub-sampled DMRS may be used in the mini-slots. For example, the same sub-sampled signal could be used in each mini-slot. Where there are fewer repetitions than sub-sampled signals only a sub-set will be utilised. The sub-samples do not need to be used in order, and the order could be modified to improve the separation of DMRS between adjacent mini-slots. Similarly, when only a sub-set of sub-sampled DMRS are used the sub-set may be selected as the most distant options.

The principle application, as mentioned above, is for transmission of PUSCH with repeated mini-slots and with a single antenna port, but other applications may be possible.

The proposed techniques are applicable where only a single UE is scheduled on the resources. If multiple UEs are scheduled without knowledge if sub-sampling is enabled, channel estimation may not be possible. If multiple UEs share the resources then the same sub-sampling should be applied to all UEs.

The above description has been given in relation to Type 1 DMRS, but the principles are equally applicable to other DMRS types, in particular Type 2 as discussed hereinbelow.

In the above description the DMRS is transmitted in the first symbol of each mini-slot, but other symbols could also be utilised with the same principles disclosed herein, depending on system design.

In the above examples, the mini-slots are repeated adjacent to each other, but this is not necessary and there could be a time gap between repetitions. As an example, such time gap can result if one or more mini-slots have to be transmitted in the subsequent slot and there are some symbols in the previous slot.

FIG. 7A shows a Type 2 DMRS signal for a single DMRS symbol capable of multiplexing up to 6 ports. FIG. 7B shows two sub-sampled DMRS for Port 0 with a ½ sampling rate. These DMRS may be utilised in the same manner described above. As seen in FIG. 7B the DMRS resource elements only have an off-set of one block between signals. This may limit the frequency coherence of the DMRS. This could be addressed by offsetting the second pattern by more frequency blocks, for example 3. This results in a DMRS pattern of LTE cell specific reference symbols which were optimal for their frequency displacement. This would also facilitate the re-use of LTE channel estimation and interpolation algorithms for the devices.

In order to apply the techniques described herein, a UE must be instructed which DMRS configuration to utilise. This may be accomplished using RRC signalling. For example, a DMRS-UplinkConfig message may be utilised to indicate activation and sub-sampling configuration.

However, a drawback of utilising RRC signalling is that it leads to a relatively static configuration. This contrasts with the strict latency and reliability requirements of URLLC services which may be better met by enabling a rapid, dynamic, adjustment of the configuration. An alternative signalling structure may therefore be implemented rather than RRC. For example, the UL grant DCI message may be utilised to configure the DMRS signalling. This could be achieved by adding a small number of bits to the DCI message to indicate the sub-sampling configuration to utilise. 2 bits may be sufficient, for example:—

00 No DMRS sub-sampling
01 DMRS Sub-sampling with a factor ½
10 DMRS Sub-sampling with a factor ⅓
11 DMRS Sub-sampling with a factor ⅙

It may alternatively be possible to re-purpose other parameters in a DCI message to minimise the signalling overhead. For example, since the disclosure herein is concerned with single-port transmission, the antenna port field in the DCI may be utilised to indicate DMRS sub-sampling. RRC signalling may configure a UE for single-port operation (for example, Port 0) and then antenna port field of the UL grant DCI message may be utilised to indicate the activation of DMRS type, sub-sampling and/or sub-sampling factor.

As will be apparent the above disclosure is applicable equally to PUSCH with and without frequency-hopping. For repetitions with frequency hopping, the sub-sampling needs to be applied to each hop independently and then the channel estimation can be performed at the base station combining all the available DMRS for each hop.

Even with the techniques described above the DMRS may still consume significant resources in a repeated mini-slot due to the presence of the DMRS in every mini-slot. In cases where the mini-slot length is short the DMRS may occur so close together that each subsequent repetition does not significantly improve the channel estimate. Instead of repetition of DMRS in every mini-slot the resources may be better utilised for data transmission.

It may therefore be desirable to vary the DMRS provision (with or without the techniques described above) through the repetitions of the mini-slot. This may be indicated to the UE by indicating where additional DMRS should be transmitted through the aggregated mini-slots. The standards provide a signal "DMRS-AdditionalPosition" (TS 38.211) which is utilised to instruct a UE where to position additional DMRS within a slot or mini-slot. In the following process the additional position signal may be utilised to apply to the aggregated mini-slots as a whole, rather than each mini-slot individually.

Figure 8:
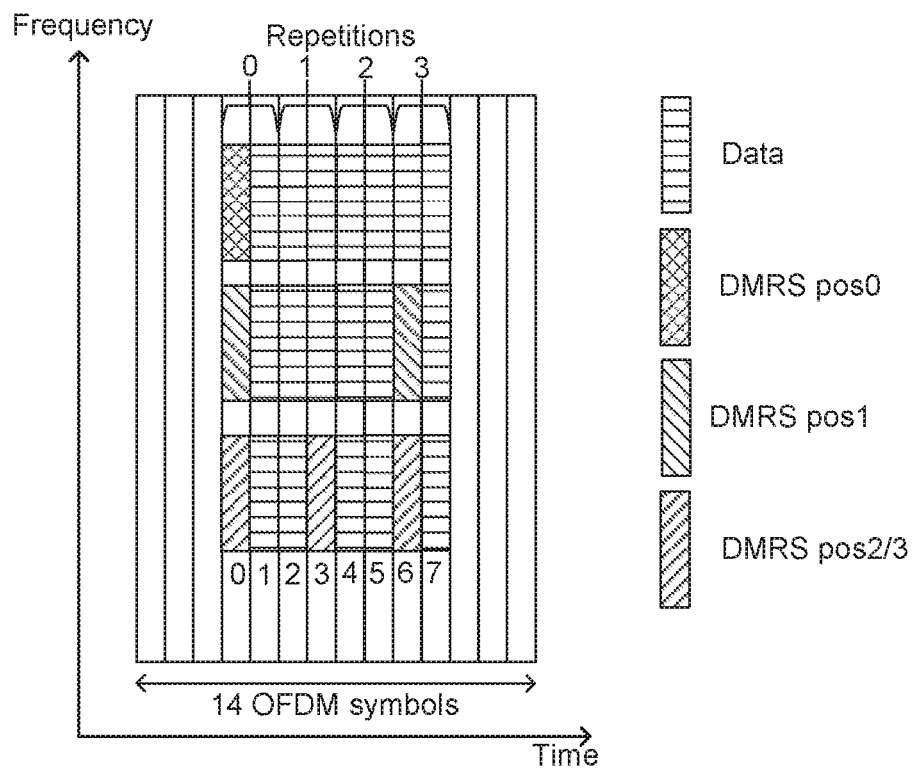
FIG. 8 shows an example of DMRS in aggregated mini-slots.

FIG. 8 shows an example in which four values of DMRS-AdditionalPosition are used to indicate the position of DMRS within the aggregated mini-slots. FIG. 8 shows four repetitions of a 2-symbol mini-slot.

For 'DMRS pos0' only the first mini-slot has DMRS and the remaining 3 repetitions do not have DMRS, for 'DMRS pos1' symbol 6 contains DMRS which is the second symbol of the third mini-slot. For 'DMRS pos2/3', also symbol 3 contains DMRS, i.e. the second symbol of the second mini-slot.

This technique enables the DMRS overhead to be controlled by providing the DMRS repetition to be controlled independently of the repetitions of mini-slots.

In NR Rel.15, the DMRS time-frequency patterns are configured semi-statically via higher layer signalling. However, V2X scenarios require that the DMRS time-frequency patterns are signalled dynamically in the control information. The reasons are:
1. Numerous highly variable relative speeds between devices. Devices need to able to quickly adapt transmission parameters to those conditions.
2. Distance between devices is variable. Thus, devices in close proximity may experience strong line-of-sight conditions and thus the channel is mostly frequency flat. Whereas devices further away experience a frequency selective channel.

Therefore, both the DMRS sub-sampling factor (controlling the DMRS density in the frequency domain) as well as the DMRS additional positions (DMRS density in time domain) may be dynamically signalled in the control information. Thus, the signalling will be done in the downlink control information (DCI) for cellular application and in the sidelink control information (SCI) for V2X applications.

This signalling can be done as follows:
1. Indicating the row index to a pre-configured table which chooses DMRS sub-sampling factor and DMRS additional temporal positions.
2. Both sub-sampling factor and number of additional DMRS position can be signalled independently Row Index Indication to a Pre-Configured Table:

An example table is given in Table 1. Each row defines a pair of sub-sampling factor and DMRS Additional Position parameter. The value N indicated in the control information (DCI or SCI) field addresses row N+1. The column titles, and set of columns, are given by way of example only. Other nomenclature and/or combinations of columns may be utilised without departing from the principles disclosed herein.

TABLE 1

Example of time-frequency density signalling table

| Row index | Sub-sampling Factor | DMRS Additional Positions |
|---|---|---|
| 1 | 1 | pos0 |
| 2 | 2 | pos0 |
| 3 | 2 | pos0, pos1 |
| 4 | 2 | pos0, pos1, pos2 |
| 5 | 3 | pos0, pos1, pos2 |

It is possible to define multiple tables depending for instance on the numerology of the transmission. This is important as different numerologies will need different sub-sampling factors for the same channel environments. The numerology of the transmission is known so there is no need for additional signalling.

Both sub-sampling factor and number of additional DMRS position can be signalled independently.

In this case the control information (DCI or SCI) contains a field for signalling the sub-sampling factor as described earlier. In addition, the dynamic control information contains a field to signal the DMRS additional positions, an example is given in Table 2, where Pos1 means one additional position, Pos2 two additional positions etc.

TABLE 2

Example of DMRS Additional Position signalling.

| SCI field | DMRS Additional position |
|---|---|
| 00 | Pos1 |
| 01 | Pos2 |
| 10 | Pos3 |
| 11 | Pos4 |

The exact location of the DMRS symbols is then determined by another table depending on transmission type etc and can be known to the devices either by specification or configured through higher layer signalling.

Although not shown in detail any of the devices or apparatus that form part of the network may include at least a processor, a storage unit and a communications interface, wherein the processor unit, storage unit, and communications interface are configured to perform the method of any aspect of the present invention. Further options and choices are described below.

The signal processing functionality of the embodiments of the invention especially the gNB and the UE may be achieved using computing systems or architectures known to those who are skilled in the relevant art. Computing systems such as, a desktop, laptop or notebook computer, hand-held computing device (PDA, cell phone, palmtop, etc.), mainframe, server, client, or any other type of special or general purpose computing device as may be desirable or appropriate for a given application or environment can be used. The computing system can include one or more processors which can be implemented using a general or special-purpose processing engine such as, for example, a microprocessor, microcontroller or other control module.

The computing system can also include a main memory, such as random access memory (RAM) or other dynamic memory, for storing information and instructions to be executed by a processor. Such a main memory also may be used for storing temporary variables or other intermediate information during execution of instructions to be executed by the processor. The computing system may likewise include a read only memory (ROM) or other static storage device for storing static information and instructions for a processor.

The computing system may also include an information storage system which may include, for example, a media drive and a removable storage interface. The media drive may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media may include, for example, a hard disk, floppy disk, magnetic tape, optical disk, CD or DVD, or other fixed or removable medium that is read by and written to by media drive. The storage media may include a computer-readable storage medium having particular computer software or data stored therein.

In alternative embodiments, an information storage system may include other similar components for allowing computer programs or other instructions or data to be loaded into the computing system. Such components may include, for example, a removable storage unit and an interface, such as a program cartridge and cartridge interface, a removable memory (for example, a flash memory or other removable memory module) and memory slot, and other removable storage units and interfaces that allow software and data to be transferred from the removable storage unit to computing system.

The computing system can also include a communications interface. Such a communications interface can be used to allow software and data to be transferred between a computing system and external devices. Examples of communications interfaces can include a modem, a network interface (such as an Ethernet or other NIC card), a communications port (such as for example, a universal serial bus (USB) port), a PCMCIA slot and card, etc. Software and data transferred via a communications interface are in the form of signals which can be electronic, electromagnetic, and optical or other signals capable of being received by a communications interface medium.

In this document, the terms 'computer program product', 'computer-readable medium' and the like may be used generally to refer to tangible media such as, for example, a memory, storage device, or storage unit. These and other forms of computer-readable media may store one or more instructions for use by the processor comprising the computer system to cause the processor to perform specified operations. Such instructions, generally 45 referred to as 'computer program code' (which may be grouped in the form of computer programs or other groupings), when executed, enable the computing system to perform functions of embodiments of the present invention. Note that the code may directly cause a processor to perform specified operations, be compiled to do so, and/or be combined with other software, hardware, and/or firmware elements (e.g., libraries for performing standard functions) to do so.

The non-transitory computer readable medium may comprise at least one from a group consisting of: a hard disk, a CD-ROM, an optical storage device, a magnetic storage device, a Read Only Memory, a Programmable Read Only Memory, an Erasable Programmable Read Only Memory, EPROM, an Electrically Erasable Programmable Read Only Memory and a Flash memory. In an embodiment where the elements are implemented using software, the software may be stored in a computer-readable medium and loaded into computing system using, for example, removable storage drive. A control module (in this example, software instructions or executable computer program code), when executed by the processor in the computer system, causes a processor to perform the functions of the invention as described herein.

Furthermore, the inventive concept can be applied to any circuit for performing signal processing functionality within a network element. It is further envisaged that, for example, a semiconductor manufacturer may employ the inventive concept in a design of a stand-alone device, such as a microcontroller of a digital signal processor (DSP), or application-specific integrated circuit (ASIC) and/or any other sub-system element.

It will be appreciated that, for clarity purposes, the above description has described embodiments of the invention with reference to a single processing logic. However, the inventive concept may equally be implemented by way of a plurality of different functional units and processors to provide the signal processing functionality. Thus, references to specific functional units are only to be seen as references to suitable means for providing the described functionality, rather than indicative of a strict logical or physical structure or organisation.

Aspects of the invention may be implemented in any suitable form including hardware, software, firmware or any combination of these. The invention may optionally be implemented, at least partly, as computer software running on one or more data processors and/or digital signal processors or configurable module components such as FPGA devices.

Thus, the elements and components of an embodiment of the invention may be physically, functionally and logically implemented in any suitable way. Indeed, the functionality may be implemented in a single unit, in a plurality of units or as part of other functional units. Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognise that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognise that various features of the described embodiments may be combined in accordance with the invention. In the claims, the term 'comprising' or "including" does not exclude the presence of other elements.

The invention claimed is:

1. A method for configuring a temporal position of DeModulation Reference Symbols (DMRS) in sidelink transmissions of UEs in a cellular communications network, the method comprising:
    configuring in a cellular communications network a plurality of DMRS temporal position configurations,
    selecting a DMRS temporal position configuration,
    transmitting a sidelink control information (SCI) message to a UE including an indication of the selected DMRS temporal position configuration, and
    transmitting data from the UE comprising DMRS in the temporal positions indicated by the configuration,
    wherein the DMRS temporal position configurations are transmitted to the UEs by higher layer signaling that comprises Radio Resource Control (RRC) signaling.

2. The method according to claim 1, wherein the plurality of DMRS temporal position configurations are stored in at least one preconfigured table.

3. The method according to claim 2, wherein the indication of the selected DMRS temporal position configuration is an index to an entry in the at least one preconfigured table.

4. The method according to claim 2, wherein one of the at least one preconfigured table comprises options for a number of additional DMRS positions to be used in a transmission.

5. The method according to claim 2, wherein one of the at least one preconfigured table comprises options for a position of additional DMRS positions in a transmission.

6. The method according to claim 2, wherein one of the at least one preconfigured table comprises options for a sub-sampling factor for DMRS signals in a transmission.

7. The method according to claim 2, wherein the at least one preconfigured table comprises a single table.

8. The method according to claim 1, wherein the plurality of DMRS temporal position configurations are stored at each relevant UE of the cellular communications network.

9. The method according to claim 1, wherein the data is transmitted on a Physical Sidelink Shared Channel (PSSCH) associated with the SCI message.

10. The method according to claim 1, wherein the data is transmitted in a plurality of aggregated mini-slots and the DMRS temporal position configuration applies across the aggregated mini-slots.

11. The method according to claim 1, wherein the sidelink control information (SCI) is transmitted from a base station to the UE.

* * * * *